INVENTOR.
CHESTER O. MERCHANT

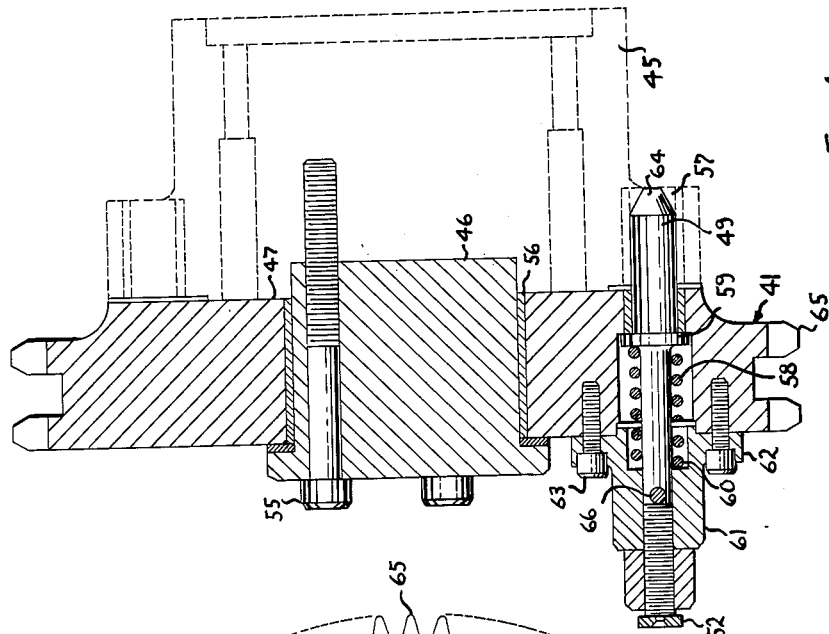
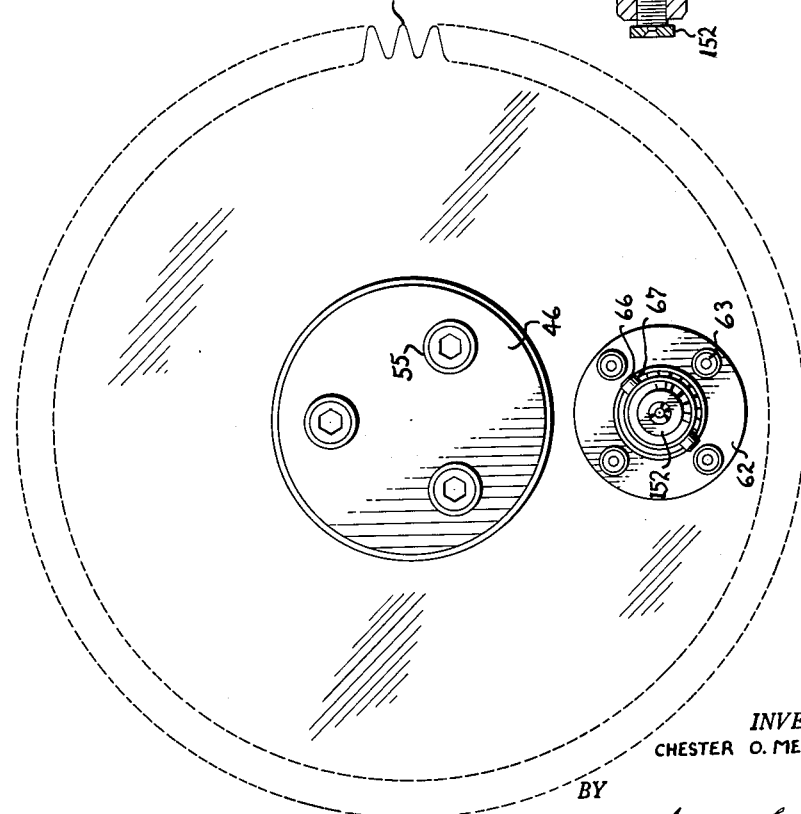
INVENTOR.
CHESTER O. MERCHANT
BY
Charles L. Lovercheck
ATTORNEY

United States Patent Office 3,039,597
Patented June 19, 1962

3,039,597
STRAIGHT LINE INDEXING MACHINE WITH CHAIN TIGHTENER AND DRIVE RELEASE
Chester O. Merchant, Erie, Pa., assignor to Swanson-Erie Corporation, Erie, Pa., a corporation of Pennsylvania
Filed May 18, 1959, Ser. No. 813,722
2 Claims. (Cl. 198—208)

This invention relates to indexing devices and, more particularly, to supports for indexing articles of manufacture from one predetermined position to another to subject them to various manufacturing operations.

This application is a continuation in part of patent application, Seriel No. 568,488, filed February 29, 1956, which issued an Patent No. 2,887,209 on May 19, 1959.

In the manufacture of various articles, there has long been a need to provide a means for moving the articles along a straight line around a rectangular path whereby the articles can be stopped with precision at a plurality of predetermined positions along the path along which they can be subjected to manufacturing operations. The present application discloses an indexing device which is simpler and more efficient for certain applications than the device disclosed in the said parent application.

It is, accordingly, an object of this invention to provide an indexing device wherein articles of manufacture may be moved along a predetermined path and stopped with precision at predetermined positions along the path.

Another object of the invention is to provide a machine with a part carrying chain which has rigid part supports which will hold articles of manufacture in rigid relation in their travel around its periphery with an article and/or tool support arranged on the support for the machine.

A still further object of this invention is to provide a specific clutch in combination with a specific precision article indexing means.

Yet a further object of the invention is to provide an improved rigid precision indexing means in combination with a specific chain adjusting means.

It is a further object of the invention to provide an improved machine comprising a table having an integral table top and having a rigid track guiding a precision chain around the edges of the table top.

Still another object of this invention is to provide a specific drive in combination with an indexing machine.

It is another object of the invention to provide an indexing device for moving articles of manufacture from one predetermined position to another and to provide specific supporting devices in combination with the device.

Still yet another object of the invention is to provide an indexing device which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 3 is a cross sectional view of the drive sprocket for the movable chain of the device; and FIG. 4 is an enlarged top view of the sprocket.

Figure 2:
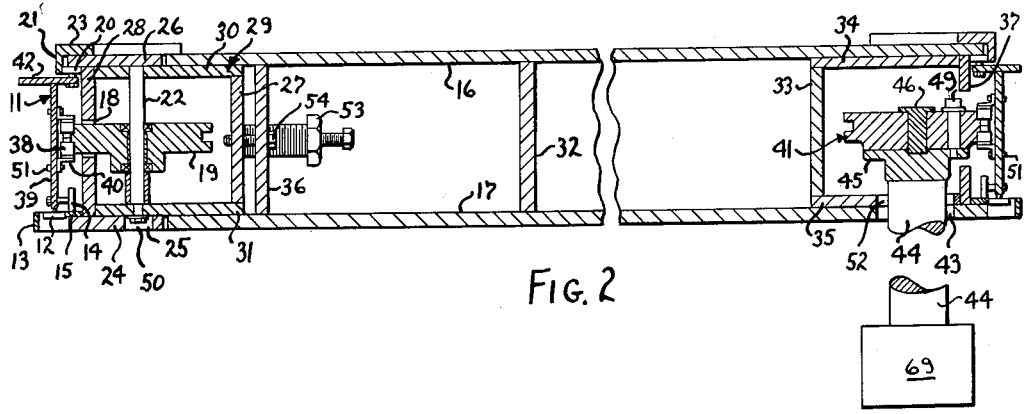
FIG. 2 is a cross sectional view of the indexing device shown in FIG. 1 taken on line 2—2 of FIG. 1.
Figure 1:
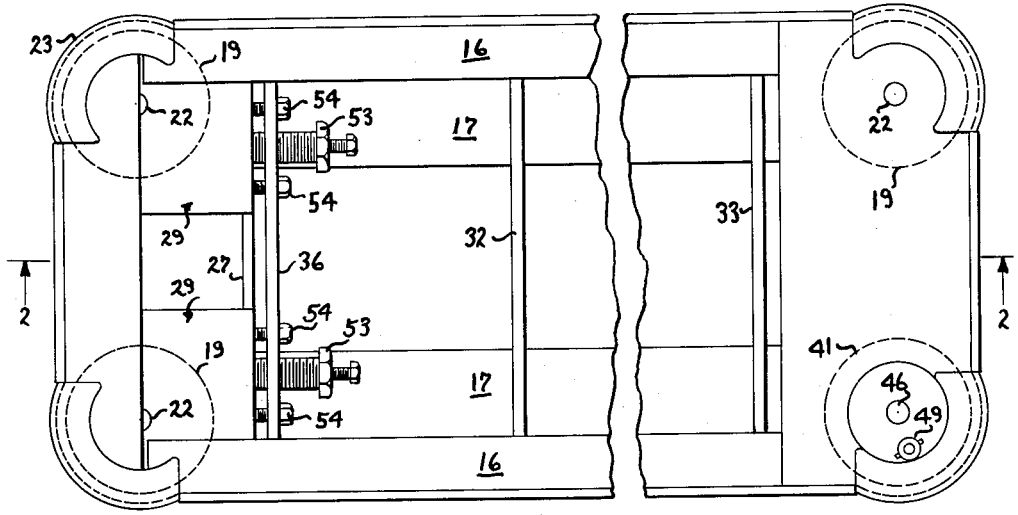
FIG. 1 is a top view of an indexing device according to the invention.

Now with more specific reference to the drawings, an indexing machine is shown made up of a table having laterally spaced top plates and laterally spaced bottom plates. A chain is rotatable about the table between the top plates and the bottom plates. The chain has plates for supporting tools and articles of manufacture thereon.

The table is made up of spaced top plates 16 which are supported in vertically spaced relation to bottom plates 17 by web members 32 and 36. The web members 32 and 36 are in the form of plates which extend laterally across the table between the top plates 16 and the bottom plates 17 and may be welded thereto as desired to form a rigid form. The ends of the top plates 16 and the bottom plates 17 are held in spaced relation at the drive end or right hand end thereof by the structure made up of a vertically disposed plate 37 having a slot therein to allow a portion of a sprocket 41 to extend therethrough and a vertically disposed plate 33 which is disposed between horizontally disposed reinforcing plates 34 and 35. The plates 34 and 35 lie in juxtaposed position with the inside surface of the top plate 16 and the bottom plate 17 as shown. Therefore, the plates 16, 32, 33, 34, 35, 36, and 37 form a rigid box like structure.

The web member or plate 36 is spaced inwardly from the tightener end of the top plates 16 and the bottom plates 17 and forms a space therebetween to receive a slidable chain tightener member 29. The chain tightener 29 is made up of a top bearing plate 30 and a bottom bearing plate 31 rigidly connected together in box fashion by welding or the like. A top tightener plate 26 rests on the plate 30 and overlies the upper ends of a web plate 28. The plate 28 is welded at its upper end to the outer end of the plate 30 and to the bottom of the plate 26. The bottom end of the plate 28 is welded to the plate 31. A plate 27 is disposed between the plates 30 and 31 and welded to the plates 30 and 31 at its top and bottom end, respectively. Therefore, the plates 27, 28, 30, and 31 form a rigid box like structure which ish slidable between the drive ends of the plates 16 and 17 and guided in a precision path thereby.

The chain tightener 29 has a track at the upper end thereof which forms a continuation of a track 68 on the drive end. The track is formed by a channel 23 which has a horizontal leg welded to the plate 26 and its vertical leg extending downwardly and spaced outwardly from the plate 28 so that a space is formed to carry a roller 20 between a vertical leg 21 and the plate 28. A plate 24 has a hole 25 therein which receives the lower end of an axle 22. The axle 22 has its upper end disposed in a hole in the plate 30 and its lower reduced sized end is received in a hole in the plate 31. A nut 50 rigidly locks the axle 22 in the plate 31.

A sprocket 19 is rotatably supported on the axle 22 and one side thereof extends outwardly through a slot 18 in the plate 28. The plate 24 is welded to the plate 31 and it extends outwardly therefrom as shown and forms a support for a track 15. The track 15 rests on top of the outer end of the plate 24 and forms a support for a roller 14. A guide member 13 has its outer ends attached to the plate 24 and it extends around rollers 12 to prevent them from leaving the outer edge of the track 15. The top edge of the track 15 forms a track for the rollers 14 and the outer edge of the track 15 forms a supporting surface for the rollers 12.

A chain 11 is made up, inter alia, of links 38 which are attached to plates 39 by means of angles 40 held thereto by means of rivets 51. The plates 39 extend in a vertical plane and have plates 42 fixed to their upper ends and disposed in a horizontal plane and at right angles thereto. The inner ends of the plates 42 have the rollers 20 attached thereto and rotatable about a vertical axis thereon. The lower ends of the plates 39 have the rollers 14 attached thereto and rotatable about a horizontal axis.

At the drive end of the table, the top plates 16 are welded to the plate 34 and the bottom plates 17 to the plate 35. The plates 17 and 35 have openings 43 and 52 therein which receive a shaft 44. The shaft 44 will be driven by a suitable indexing device indicated at 69 such as disclosed in the said parent application. The upper end of the shaft 44 has a hub 45 attached thereto and the hub 45 has a reduced size portion 46 attached thereto and terminating at a flat shoulder 47.

The sprocket 41 is supported on the reduced size portion 46 and rests against the shoulder 47. The sprocket 41 is held against rotation on the reduced size portion 46 by a pin 49 which, when in the locked position, enters a hole in the hub 45. Therefore, when the pin 49 is in the position shown, the sprocket 41 will be locked to the hub 45. When the pin 49 is pulled upwardly, the sprocket 41 can rotate freely relative to the hub 45 and the chain 11 can be adjusted to the desired position independent of the shaft 44. The particular structure of the tightener 29 makes it possible to tighten the chain 11 and yet help the chain 11 in precision relation to the table. There will be three sprockets 19 in the machine, two at the tightener end and one on the drive end at the corner opposite the sprocket 41.

The chain tightener 29 is controlled by jacking screw members 53 which are threadably received in the holes in the plate 36 and engage the plate 27 at the outer end. Studs 54 extend through unthreaded holes in the plate 36 and threadably engage the plate 27. Therefore, to tighten the chain 11, it is merely necessary to loosen the studs 54 and to tighten the jacking screws 53. This will cause the chain tightener 29 with the sprocket 19 thereon to slide to the left.

The free driving sprocket 41 is shown in enlarged detail in FIG. 4. The reduced size portion 46 is attached to the hub 45 by means of studs 55. The reduced size portion 46 enters a bore in the top of the hub 45 and is held therein by the studs 55. A bearing 56 is disposed between the reduced size portion 46 and the sprocket 41. The flange in the upper end of the reduced size portion 46 overlies the sprocket 41 and holds it in position.

The pin 49 is urged into an opening 57 by means of a spring 58 which is disposed between an enlarged flange 59 on the pin 49 and a bore 60 in a cap 61. The cap 61 has a flange 62 with spaced holes therein which receives studs 63 which are received in threaded holes in the sprocket 41 and hold it therein. The pin 49 has a conical end 64 which guides it into the opening 57 in the sprocket 41.

The sprocket 41 has teeth 65 which carry the chain 11 and the sprocket 19 has similar teeth. The pin 49 has a transverse stop 66 which is received in a vertical slot 67 in the cap 61 and when the pin 49 is pulled outwardly by means of a screw handle 152, the pin 49 may be rotated and the stop 66 will rest on top of the cap 61.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An indexing machine comprising a table, a chain rotatable around said table, indexing means for said chain, said table comprising a top plate disposed in a generally horizontal plane and a bottom plate in vertically spaced relation to each other, web plates attached to said top and bottom plates holding said top and bottom plates in rigid relation, fixed sprockets supported on one end of said table between said plates, a chain tightener on the other end of said table, said chain tightener comprising a rigid box like member having spaced upper and lower plates held in spaced relation to each other by spacer plates attached thereto, said upper and lower plates being slidable and closely fitting between said top and bottom plates, threaded means on said web plates engaging said spacer plates for moving said box like member to tighten said chain, sprockets on said rigid box like member on axles extending into said upper and lower plates, said chain supported on said sprockets and rotatable thereon, a tightener plate on said rigid member having a top surface flush with the top surface of said top plate, said top plate and said tightener plate comprising means to support tools, and vertical plates on said chain disposed in a vertical plane for attaching articles of manufacture to be processed by said tools, said threaded means comprising a jack screw threadably attached to one said web plate and engaging means on said tightener plate whereby said tightener plate is urged away from said table, and means to lock said chain tightener and said table together.

2. An indexing machine comprising laterally spaced table top plates disposed in a horizontal plane, table bottom plates disposed in a horizontal plane in vertically spaced relation to said table top plates, transversely extending webs holding said plates in spaced relation to each other, a drive member at the drive end of said machine, a drive sprocket attached to said drive member and disposed between said table top and bottom plates, a chain tightener having a part thereof disposed between said table top and bottom plates and slidable therebetween, said tightener comprising spaced upper and lower tightener plates rigidly attached together by a tightener web plate and disposed in horizontal planes and in slidable relation with said top and bottom plates and between said top and bottom plates, jacking screws in one said transversely extending web engaging said tightener web plate and rotatable to move said tightener toward and away from said tightener web plate, means to lock said chain tightener to said table top plates after they have been moved by said jacking screws spaced sprockets on said tightener between said top and bottom plates and freely rotatable therebetween, a chain extending around a table on said machine and supported on said sprockets, spaced plates attached to said chain and disposed generally in alignment thereon, rollers at the tops and bottoms of some of said plates and rotatable about vertical axes, guide means for said rollers on said top plates and said bottom plates, and rollers rotatable about a horizontal axis and engaging guide means on said bottom plates.

References Cited in the file of this patent

UNITED STATES PATENTS

| | | |
|---|---|---|
| 829,028 | Moore et al. | Aug. 21, 1906 |
| 2,793,733 | Karageorgieff | May 28, 1957 |
| 2,860,404 | Alden | Nov. 18, 1958 |
| 2,887,209 | Merchant et al. | May 19, 1959 |